United States Patent [19]
Nagata

[11] Patent Number: 4,494,621
[45] Date of Patent: Jan. 22, 1985

[54] STEERING CONTROL SYSTEM FOR CRAWLER TRACTOR TYPE VEHICLES

[75] Inventor: Yoshihiro Nagata, Kyoto, Japan

[73] Assignee: Kabushiki Kaisha Komatsu Seisakusho, Tokyo, Japan

[21] Appl. No.: 415,841

[22] Filed: Sep. 8, 1982

[30] Foreign Application Priority Data

Sep. 10, 1981 [JP] Japan ............................... 56-141657

[51] Int. Cl.³ ..................... B60K 41/24; B62D 11/08
[52] U.S. Cl. .................................... 180/6.2; 137/596;
       137/596.2; 180/6.7; 192/12 C; 192/13 R
[58] Field of Search ...................... 180/6.2, 6.24, 6.26,
       180/6.3, 6.32, 6.48, 6.7, 170; 192/4 A, 13 R, 12
       C; 137/596, 596.2

[56] References Cited

U.S. PATENT DOCUMENTS

| | | | |
|---|---|---|---|
| 3,017,941 | 1/1962 | Baker | 192/4 A X |
| 3,282,286 | 1/1966 | Glidden et al. | 137/596 X |
| 3,722,541 | 3/1973 | Wilke | 137/596 |
| 3,760,896 | 9/1973 | Kawamura et al. | 180/6.7 |
| 3,785,450 | 1/1974 | Suzuki | 180/6.7 |
| 3,808,812 | 5/1974 | Kawamura et al. | 60/4.84 |
| 4,015,619 | 4/1977 | Shore et al. | 192/12 C X |
| 4,093,048 | 6/1978 | Hakes et al. | 192/13 R |
| 4,401,132 | 8/1983 | Hakes et al. | 137/596 |

FOREIGN PATENT DOCUMENTS

245683 1/1961 Australia ........................ 137/596.2

Primary Examiner—David M. Mitchell
Assistant Examiner—Mitchell J. Hill
Attorney, Agent, or Firm—Armstrong, Nikaido, Marmelstein & Kubovcik

[57] ABSTRACT

A steering control system for crawler tractor type vehicles with dual power trains which is capable of separately driving left and right endless track mechanisms and comprises an interlocking valve unit and a hydraulic circuit, the interlocking valve unit being located between a manually operated section and an actuating section and adapted to operatively connect these two sections with each other, the manually operated section including left and right steering levers and a commonly used brake pedal, the actuating section including left and right steering brake units and a center clutch unit, the hydraulic circuit selectively supplying hydraulic fluid delivered by a hydraulic pump into the actuating section in response to the action of the interlocking valve unit caused by the manipulation of either of the steering levers and/or the brake pedal.

6 Claims, 4 Drawing Figures

STEERING CONTROL SYSTEM FOR CRAWLER TRACTOR TYPE VEHICLES

BACKGROUND OF THE INVENTION

This invention relates to a steering control system for crawler tractor type vehicles, and more particularly to hydraulic controls of a steering control system for endless track type tractors or crawler tractor type vehicles having dual power trains.

In the vehicles having dual power trains, the power developed by the engine is transmitted through a power distributor unit to respective torque converters provided in the left and right power transmission trains, and then through a universal joint to each of the input shafts of the left and right transmission gear units. The power thus transmitted will actuate a transmission control valve in response to the fluctuations of the load, and the power selected by the clutch located in the transmission gear unit is decelerated by a transfer device, and then transmitted to a bevel pinion. The power which is, in turn, transmitted to the rearward of the vehicle is converted from the longitudinal direction to the direction at right angles thereto by means of a bevel gear associated with the bevel pinion and mounted on the transverse shaft. The power transmitted to the transverse shaft is transmitted to the sprockets while it is being decelerated by pinions of the final drive. In the intermediate portion of the transverse shaft, there is mounted a center clutch unit which divides the shaft into two parts, namely, left and right parts. By engaging or disengaging a center clutch in the center clutch unit, the vehicle can be driven straight or be turned. Further, because the left and right transverse shafts can be rotated by coupling the center clutch, it becomes possible to prevent the vehicle from its zigzag movement due to unbalance in the power transmitted to the left and right power trains, and also it becomes possible to prevent the vehicle from running obliquely due to a difference in the running resistances to which the left and right power transmission trains are subjected during operations such as side cutting in which uneven loads are applied to them.

In the prior art steering control system for vehicles having left and right power transmission trains disclosed, for example, in the specification of the U.S. Pat. No. 3,785,450, three power units, namely, the transmission gear unit, steering brake units and a center clutch unit have been independently controlled by means of the left and right steering levers and the brake pedals, respectively. Therefore, a great many directly connected linkages and interlocking linkages are required to be installed, and further in order to perform a predetermined operational sequence between the power units, it is required to adjust many parts to be assembled such as cam mechanisms, elongated holes and loose springs, etc. For this reason, a great deal of adjustments jobs are required not only when the power units are assembled at factories, but also when they are worn out due to their use for an extended period of time and replaced with new ones at work sites. For examples, upon adjustments of the connection of linkages associated with the center clutch and the transmission gear units and adapted to be actuated by means of the steering lever, if the linkages are connected so as to reverse their operational sequence, then the load applied on the center clutch will increase to cause it to slide which results in early wear-down of it. Further, upon adjustments of the connection of linkages associated with the transmission gear units and the steering brake units and adapted to be operated by the steering lever, if the linkages are connected so as to reverse their operational sequence, then the load will be concentrated on the brake thus causing an early wear-down thereof. Still further, upon adjustments of the connection of linkages associated with the steering brake units and the center clutch unit, if the aforementioned poor adjustments are made, then it becomes impossible to effect the turning operation of the vehicle. Still further, regarding brake linkages actuated by the brake pedals, if the synchronized operations of the left and right linkages are not made positively, then the load is concentrated on only the brake on one side when the brake pedal is depressed, while the other brake will be put under half brake condition thus causing insufficient braking force and early wear-down of the brake on one side.

SUMMARY OF THE INVENTION

The present invention has been contemplated to eliminate such disadvantages of the prior art steering control system and has for its object to provide a novel steering control system for crawler tractor type vehicles having dual power trains wherein the correlative operation of the steering brake units and the center clutch unit is controlled by a single interlocking valve means interposed therebetween to thereby dispense with the aforementioned cam mechanism and elongated holes, reduce the use of many interlocking linkages and loose springs, facilitate the assembly of component parts, prevent the early wear-down of the steering brake units and the center clutch units and ensure the control operation thereof.

According to the present invention, the above and other objects can be attained, in one aspect, by the provision of a steering control system for crawler tractor type vehicles comprising an engine; a power distributor unit adapted to distribute the power derived from the engine into two equal, independent portions; left and right independent torque converters which receive the equally distributed portions, respectively; a power transmission mechanism with left and right dual power trains independent of each other, each including a transmission gear unit, a steering brake unit and a reduction gear unit and adapted to transmit the power from the left or right torque converter to left or right drive wheel, respectively; and a center clutch unit adapted to directly connect or disconnect left and right power take-off transverse shafts, characterized in that said steering control system comprises an interlocking valve unit located between a manually operated section and an actuating section and adapted to operatively connect the manually operated section with the actuating section, said manually operated section including a pair of left and right steering levers, linkages connected to the steering levers, respectively, a commonly used brake pedal and a linkage connected to the brake pedal, said actuating section including said left and right steering brake units and said center clutch unit; and a hydraulic circuit for selectively supplying the hydraulic fluid delivered by a hydraulic pump into said actuating section in response to the action of said interlocking valve unit caused by the manipulation of either of said left and right steering levers and/or said brake pedal, whereby said left and right steering brake units and said center clutch unit are interrelatedly operated, respectively.

The above-mentioned interlocking valve unit comprises a pair of left and right steering control valves and a single brake control valve commonly used for the left and right steering controls.

BRIEF DESCRIPTION OF THE DRAWINGS

The above and other objects, features and advantages of the present invention will become apparent from the following description taken in conjunction with the accompanying drawings in which.

DETAILED DESCRIPTION OF THE INVENTION

The present invention will now be described in detail hereinbelow by way of example only with reference to the accompanying drawings.

Figure 1:
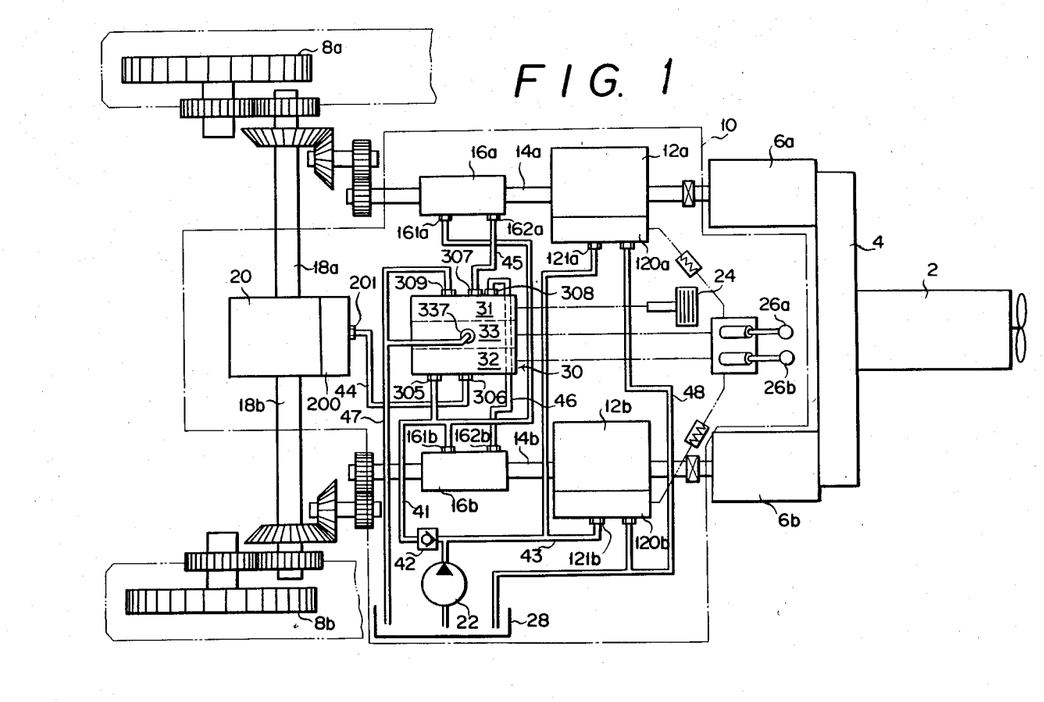
FIG. 1 is fragmentary schematic plan view of a crawler tractor type vehicle or an endless track type tractor with a power transmission system having dual power trains in which a steering control system of the present invention is incorporated.

Shown schematically in FIG. 1 is a steering control system 10 in accordance with the present invention adapted to a crawler tractor type vehicle having a dual power train type of power transmission system. The power derived from an engine 2 is transmitted through a power distributor 4 to torque converters 6a and 6b provided in the left and right power transmission trains, respectively. Respective outputs of the torque converters 6a and 6b are transmitted, in turn, through the left and right power transmission trains including the aforementioned steering control system 10 to the left and right side sprockets 8a and 8b, respectively.

The above-mentioned steering control system 10 is provided with left and right multi-speed stage transmission gears 12a, 12b and steering brake units 16a and 16b respectively mounted on power take-off shafts 14a, 14b connected to the transmission gears, respectively. Mounted on the leading end of each of the power take-off shafts 14a and 14b, is a reduction gear means adapted to transmit the power from the transmission gear to a bevel pinion shaft. There are provided transverse shafts 18a and 18b each having a bevel gear fixedly secured to a leading end portion thereof so as to convert the direction of the power thus transmitted longitudinally and rearwardly of the vehicle body (not shown) into the direction at right angles to the vehicle body. Mounted in the intermediate portion of the transverse shafts 18a and 18b is a center clutch unit 20 which enables the shafts 18a and 18b to be interconnected with or disconnected from each other.

The steering control system 10 is further provided a hydraulic circuit for controlling by pressurized fluid the aforementioned transmission gears 12a, 12b, brake means 16a, 16b and the center clutch unit 20. The hydraulic circuit system includes a fluid pump 22 and an interlocking valve unit 30 which includes a brake control valve 31 adapted to be actuated by depressing a commonly used brake pedal 24, and left and right side steering control valves 33 and 32 adapted to be rendered operative by means of left and right steering levers 26a and 26b, respectively.

Figure 2:
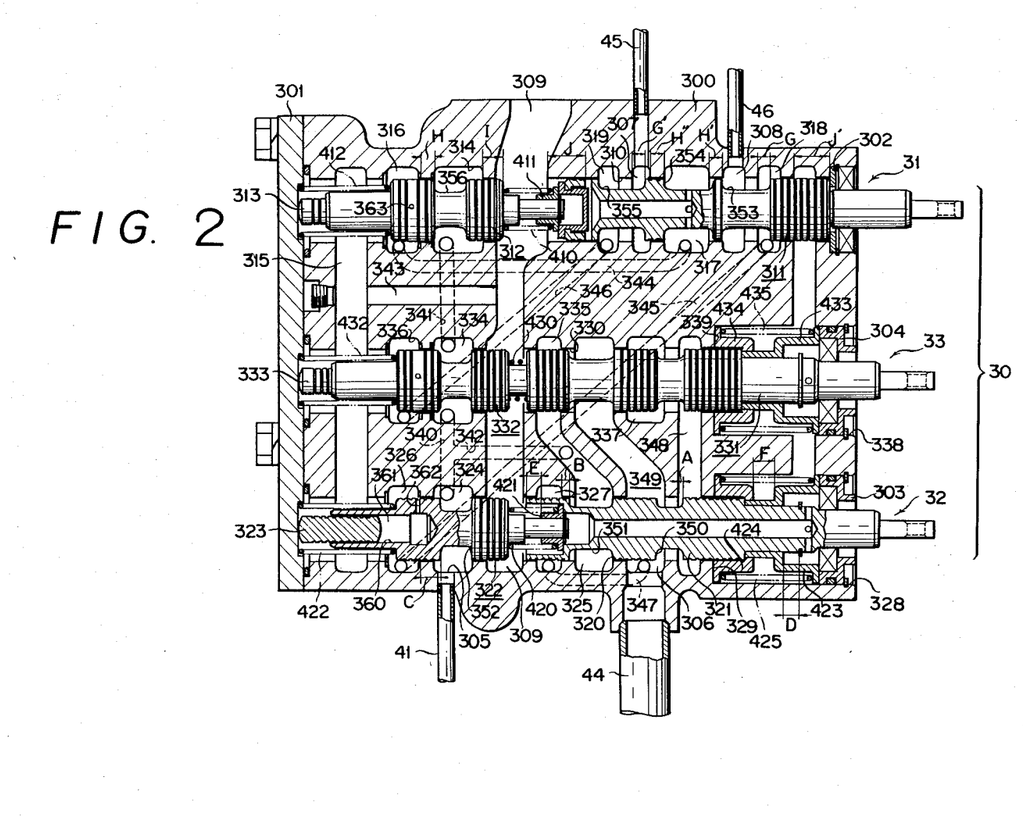
FIG. 2 is a sectional view of an interlocking valve unit forming a principal component of the steering control system of the present invention.

With reference to FIG. 2, the construction of the aforementioned interlocking valve unit will be described in more detail. The interlocking valve unit comprises a valve body 300 having three spool bores 310, 320 and 330 formed in juxtaposition. In the first spool bore 310, a first spool 311 and a second spool 312 are slidably mounted in alignment with each other. The first spool 311 forms a commonly used brake preferential change-over valve associated with the front half portion of the bore 310 in which the spool 311 is slidably inserted, whilst the second spool 312 forms a commonly used brake fluid pressure gradually increasing valve associated with the rear half portion of the bore 310 in which the spool 312 is slidably inserted. Therefore, the aforementioned brake control valve 31 comprises the brake preferential change-over valve and the brake fluid pressure gradually increasing valve.

In the second spool bore 320, a third spool 321 and a fourth spool 322 are slidably mounted in alignment with each other in like manner. The third spool 321 forms a center clutch change-over valve associated with the front half portion of the bore 320 in which the spool 321 is inserted, whilst the fourth spool 322 forms a one side (or a right) brake fluid pressure gradually increasing valve associated with the rear half portion of the bore 320 in which the spool 322 is inserted. The aforementioned right steering control valve 32 is formed by the center clutch change-over valve and the right side brake fluid pressure gradually increasing valve.

Slidably mounted in the third spool bore 330 are a fifth spool 331 and a sixth spool 332 in alignment with each other in the similar manner as the second spool bore 320, the front half portion of the bore 330 forming a center clutch change-over valve and the rear half thereof forming the other side (or a left) brake fluid pressure gradually increasing valve. The center clutch change-over valve and the left side brake fluid pressure gradually increasing valve constitute the aforementioned left steering control valve 33.

Mounted on the respective outer ends of the aforementioned second, fourth and sixth spools 312, 322 and 332 are reaction force pistons 313, 323 and 333, respectively. The end faces of these reaction force pistons are allowed to abut against a side plate 301 fixedly secured through a sealing member to the valve body 300. The outer leading ends of the first, fifth and third spools 311, 331 and 321 are each formed in a reduced diameter portion and project out through the valve body 300 and are connected through linkage means to the aforementioned brake pedal 24, the left steering lever 26a and the right steering lever 26b, respectively. The end faces of stepped portions on the base ends of these small diameter portions are allowed to abut against annular side plates 302, 303 and 304, respectively, which are fixedly secured to the valve body 300 by means of a snap ring and/or sealing member and a spacer.

The valve body 300 has an inlet port 305 formed to introduce hydraulic fluid into the valves 31, 32 and 33 within the interlocking valve unit 30, a first outlet port 306 adapted to introduce hydraulic fluid controlled within the interlocking valve unit 30 into the left and right brake units 16a and 16b, a second outlet port 307 and a third outlet port 308 adapted to introduce in the similar manner hydraulic fluid controlled within the interlocking valve unit 30 into the left and right brake units 16a and 16b, respectively, and a first drain port 309 formed at right angles to the spool bores 310, 320 and 330 and in the vicinity of the connections of the pairs of spools arranged in a longitudinal row, respectively. The inlet port 305 is formed adjacent to the drain port 309 and communicates always through passages 340, 341 and 342 with fluid pressure waiting ports 314, 324 and 334 formed within the brake fluid pressure gradually increasing valves 32 and 33, and at the same time, communicates always through a passage 342 with fluid pressure waiting ports 325 and 335 respectively formed in the respective center clutch change-over valves of the left and right steering control valves 33 and 32. Further, a second drain port 315 is formed in the brake fluid pressure gradually increasing valves at their respective positions near the outside, the drain port 315 communicating with each of the spool bores 310, 320 and 330 and also through a passage 343 with the first drain port 309.

Formed between the aforementioned fluid pressure waiting ports 314, 324 and 334 and the second drain port 315 are brake fluid pressure gradually increasing ports 316, 326 and 336, respectively. These ports 316, 326 and 336 communicate through passages 344, 345 and 346 with a port 317 common for the left and right brakes of the commonly used brake preferential change-over valve, a port 318 for the right brake and a port 319 for the left brake, respectively.

Formed between the aforementioned drain port 309 and the fluid pressure waiting port 325 is a center clutch fluid pressure control port 327 used for steering the vehicle to the right, and also formed on the opposite side of the port 325 is a center clutch fluid pressure control port 349 used for steering the vehicle to the left. Both the control ports 327 and 349 communicate with the first outlet port 306 which leads to the center clutch control valve 200. Further, a drain port 337 and a drain change-over port 348 for the center clutch controlling fluid pressure are formed in the vicinity of the port 349 thereby to achieve double check function.

As is obvious from FIG. 2, two spools in the valves 31, 32 and 33 are connected resiliently in a longitudinal row through the intermediary of fluid pressure gradual increase setting springs 410, 420 and 430, respectively. Stated briefly, the leading end of the spool of each brake fluid pressure gradually increasing valve is formed with a stepped and reduced diameter portion. Slidably mounted on the reduced diameter portions are flanged spacer rings 411, 421 (not shown) and 431 (not shown) respectively, the movement of the leading ends of which are limited by snap rings. Further, located between the flange of each of the spacer rings and the end face of the stepped portion is a fluid pressure gradual increase setting spring thereby urging the flange of each spacer ring against the rear end face of another spool of the pair.

The rear end portions of the brake fluid pressure gradually increasing valves 312, 322 and 332 in which the aforementioned reaction force pistons 313, 323 and 333 are slidably mounted are also formed with reduced diameter portions. Located on the peripheries of the reduced diameter portions are spool return springs 412, 422 and 432, respectively, which are interposed between the valve's side plate 301 and the end faces of the stepped portions on the side of the base end of the reduced diameter portions.

Further, the leading ends of the center clutch change-over spools 331 and 321 of the left and right steering control valves 33 and 32 are allowed to project through slots 338 and 328, respectively, which have a diameter somewhat larger than those of the spool bores 330 and 320. Located between the inner bottom faces 339, 329 of these slots and the aforementioned annular side plates 304, 303 are a pair of flanged annular spacers 433, 434 and 423, 424, respectively, in such a manner that they surround the periphery of each of the spools 331 and 321. Mounted between the first spacer 424, 434 and the second spacer 423, 433 are brake actuation commencing point stressing springs 435 and 425, respectively, which are resiliently held between the flanges of both the spacers to ensure that a constant distance F is maintained therebetween under the normal condition.

Now, referring back to FIG. 1, the hydraulic control circuit of the steering control system 10 according to the present invention will be described below.

The hydraulic pump 22 is connected through a conduit 48 and a check valve 42 for ensuring brake circuit fluid pressure with the inlet port 305 of the interlocking valve means and inlet ports 161a and 161b of the left and right brake unit 16a and 16b, and also through a conduit 43 with inlet ports 121a and 121b of the left and right transmission control valves 120a and 120b, respectively. The aforementioned first outlet port 306 is connected with the inlet port 201 of the center clutch control valve 200 by a conduit 44. Further, the second outlet port 307 for the left brake is connected with a left brake actuating port 162a by a conduit 45, and the third outlet port 308 for the right brake is connected with a right brake actuating port 162b by a conduit 46. Reference numerals 47 and 48 denote drain conduits for the interlocking valve unit 30 and the left and right transmission control valves 120a and 120b, respectively. The drain line of the center clutch control circuit is also connected through a port 337 of the interlocking valve unit 30 with the drain conduit 47.

Next, the operation of the interlocking valve unit 30 with the aforementioned construction will be described below.

I. First of all, the description of the operation of the steering control valve will be made with regard to the right steering control valve 32. The hydraulic fluid is delivered by the pump 22 from a tank or reservoir 28 through two conduits 41 and 43 into the inlet port 305 of the interlocking valve unit 30, the inlet ports 161a and 161b of the left and right brake means and the inlet ports 121a and 121b of the left and right transmission control valves 120a and 120b, respectively. The left and right brake units 16a and 16b are safety spring brake means wherein the brake is automatically applied by the action of the spring when the engine is stopped, and the hydraulic fluid introduced into each of the inlet ports 161a and 161b overcomes the force of the spring and renders the brake inoperative.

Hydraulic fluid supplied through the conduit 41 into the inlet port 305 will flow through the passages 340 and 341 into the fluid pressure waiting ports 314, 324 and 334 of the brake fluid pressure gradually increasing valves, respectively, and further flow through the passage 342 into the fluid pressure waiting ports 325 and 335 of respective center clutch change-over valves of the left and right steering control valves 33 and 32, thereby filling the ports 325 and 335. Under such filled condition, the fluid pressure is raised by hydraulic circuit pressure control valves (not shown) provided in the transmission control valves 120a and 120b to a predetermined supply pressure, and pressurized fluid relieved therefrom is allowed to return through drain conduit 48 into the tank 28.

(Operation I-a) When, under the foregoing condition, the right steering lever 26b is manipulated, the third and fourth spools 321 and 322 of the right steering control valve 32 are forced into the valve body as an integral unit (namely moved to the left in the drawing) so that a clearance "A" defined between the first annular recess 350 and the passage 348 is first blocked. Therefore, the center clutch drain port 337 which communicates through the passage 348 with the first outlet port 306 of the center clutch control valve is blocked so that when fluid under pressure is introduced into the first outlet port 306, it fills the latter and the condition under which the fluid pressure can be increased at any time is reached.

(Operation I-b) If the lever 26b is manipulated further to move the third and fourth spools 321 and 322 in the same direction, an overlap "B" is made to disappear and a clearance is created between the second annular recess 351 of the third spool 321 and the center clutch fluid pressure control port 327 to thereby communicate the port 327 with the fluid pressure waiting port 325. When hydraulic fluid is thus introduced into the port 327, the fluid will also flow into the first outlet port 306 which communicates through a passage 347 with the port 327. As a result, the fluid pressure is exerted on the center clutch control valve 200 so that the center clutch unit 20 is disengaged; that is, the transverse shafts 18a and 18b are made independent of each other.

(Operation I-c & d) When the manipulation of the lever 26b is continued further, the right transmission control valve 120b connected to the right steering lever 26b by way of a linkage having a loose spring is actuated to cut off the power transmission, Therefore, since the vehicle continues the power transmission only with the left side transmission gear, it becomes possible to turn the vehicle to the right.

When the lever 26b is manipulated subsequently further to move the third and fourth spools 321 and 322 as an integral member in the same direction, an overlap "C" of the fourth spool 322 will become zero. At that time, the snap ring fitted to the leading end of the third spool 321 will abut against the spacer 423 (that is; D=0) to allow the commencement of action of the reaction force by the brake actuation commencing point indicating spring 425. Therefore, the operator can perceive through the steering lever 26b the fact that the actuation of the brake is commenced.

(Operation I-e) With manipulation of the lever 26b to continuously move the spools 321 and 322 in the same direction, a clearance is created between the annular recess of the fourth spool 322 and the overlap "C" of the brake fluid pressure gradually increasing port 326 with the result that the port 326 is allowed to communicate with the fluid pressure waiting port 324. Whilst, the opposite side of the port 326 is blocked by the rear portion of the spool 322 having a large diameter. Consequently, hydraulic fluid is introduced through a passage 345 with the right brake port 318 so that the fluid may flow through the second outlet port 308 for the right brake communicating with the port 318, the conduit 46 and the right brake actuating port 162b into a right brake actuating pressure chamber (not shown) thereby to fill the chamber. When the pressure in a hydraulic fluid circuit for the right brake is thus raised, the same fluid pressure as that in the port 326 is created or exerted through an orifice 362 in a reaction force chamber 361 defined by the bore 360 formed in the fourth spool 322 and the reaction force piston 323. The fourth spool 322 is subjected to the reaction force caused by the increased pressure in the reaction force chamber 361 so that the fourth spool 322 is moved in the opposite direction (that is; to the right in the drawing) so as to compress the fluid pressure gradual increase setting spring 420. As a result, the clearance of the port 326 on the side of the overlap "C" is blocked again. However, because the leftward movement of the third and fourth spools 321 and 322 is still continued by the manipulation of the lever 26b, the aforementioned clearance is maintained. Stated in brief, the cycle including the communication, pressure raise and blocking will occur repeatedly between the annular recess 352 of the fourth spool 322 and the brake fluid pressure gradually increasing port 326. The leftward movement of the third spool 321 is, in turn, absorbed during the compressive displacement of the fluid pressure gradual increase setting spring 420 so that the fluid pressure within the port 326 will also successively increase and the distance "E" between the end of the spacer ring 421 opposite to the flange thereof and the end face of the stepped portion on the side of the leading end of the fourth spool 322 will gradually decrease. In brief, the fluid pressure gradual rise is made until the above-mentioned end of the spacer ring 421 abuts against the end face of the stepped portion of the spool 322. This will apply a slow turning brake action to the vehicle.

(Operation I-f) When the right steering lever 26b is further manipulated to effect the movement of the third and fourth spools 321 and 322 over their last or remaining stroke (to take "E" from "F") by the action of the brake actuation commencing point indicating spring 425, the fluid pressure gradually increasing action of the fluid pressure gradual increase setting spring 420 is no longer effective and the port 324 is allowed to communicate with the port 326 so that the fluid pressure in the port 326 and on the downstream thereof is equal to that in the port 324, for example, 20 Kg/cm$^2$ and a sharp turning brake is applied to the vehicle. The leftward movement of the third and fourth spools 321 and 322 will end when the spacer 423 abuts against the spacer 424; that is, the stroke end is reached.

When the lever 26b is released, the resilient forces of the spool return spring 422, the fluid pressure gradual increase setting spring 420 and the brake actuation commencing point indicating spring 425 will return the third and fourth spools 321 and 322 to their respective initial positions. As a result, supply of the fluid under pressure into the first outlet port 306 leading to the center clutch and the second outlet port 308 leading to the right brake is interrupted and the pressurized fluid which has been supplied therein will be relieved through the drain ports 309, 315 and 337 and the drain conduit 47 into the tank 28.

Further, the operation of the left steering control valve actuatable by the steering lever 26a is similar to that of the right steering control valve explained hereinbefore, and therefore the description thereof is omitted.

II. In the next place, the operation of the brake control valve 31 will described hereinafter.

When the brake pedal 24 is depressed; the first and second spools 311 and 312 are forced into the valve body 300 as an integral member. (The two spools will be moved together to the left in the drawing.)

(Operation II-g) When the first and second spools 311 and 312 are first leftwardly from the position shown in FIG. 2 by a distance G(=G') by depressing the brake pedal 24, the fluid communication between the right brake port 318 which communicates with the brake fluid pressure gradually increasing port 326 and the second outlet port 308 which communicates with the right brake unit 16b by way of the first annular recess 353 is intercepted, and the fluid communication between the left brake port 319 which communicates with the brake fluid pressure gradually increasing port 336 and the third outlet port 307 which communicates with the left brake 16a by way of a third annular recess 355 is also intercepted. As a result, the circuit for supplying the fluid pressure for the steering brake is interrupted. Therefore, while the vehicle is turning in the aforementioned steering operation, the supply of the steering brake fluid pressure for turning is cut off.

(Operation II-h) When the brake pedal is depressed further to move the spools 311 and 312 leftwardly by a distance which is equal to or more than the amount of an overlap H (H>G), the fluid pressure waiting port 314 is allowed to communicate with the brake fluid pressure gradually increasing port 316 by way of an annular recess 356 of the second spool 312, and at the same time, the overlap H' and H" of the first spool 311 is made to disappear so that the fluid communication between the port 317 commonly used for the left and right brakes, the second outlet port 308 and the third outlet port 307 is allowed.

Whilst, because the opposite side of the port 316 is blocked by the rear portion of the second spool 312 having a larger diameter, the fluid under pressure is introduced through the passage 344 into the port 317 commonly used for the left and right brakes so that the fluid may flow through the second and third outlet ports 307 and 308 which are allowed to communicate with the port 317 by way of the first and second annular recesses 353 and 354, the conduits 45 and 46 and the left and right brake actuating ports 162a and 162b into the left and right brake actuating pressure chambers (not shown) thereby filling them. Stated briefly, in the steering brake circuit, the structure giving preference to the commonly used brake is established wherein the steering brake valve is interrupted, while the fluid pressure to actuate the commonly used brake is applied preferentially. When the pressure in the hydraulic fluid circuit for the left and right brakes has thus raised, the second spool 312 is subjected to the reaction force caused by an orifice 363 and a reaction force piston 313 in the similar manner as in the case of the fourth spool 322 so that the second spool 312 is moved to the opposite side (namely to the right in the drawing). As a result, the clearance on the side of the overlap "H" of the port 316 is blocked again. However, the leftward travel of the first and second spools 311 and 312 is still continued by continuing depressing of the brake pedal 24 further, the blockage of the port 316 is changed immediately over to the communication thereby with the port 314. Thus, the fluid pressure gradual increase setting spring 410 is gradually compressed, and during the period until the end of the spacer ring 411 opposite to the flange thereof is allowed to abut against the leading end face of the stepped portion of the second spool 312, the cycle including communication, pressure increase and blockage is repeated so that the brake fluid pressure is increased gradually. After the spacer ring 411 has abutted against the leading end face of stepped portion of the second spool 312, fluid communication is made always between the ports 314 and 316 by continuously depressing the brake pedal 24 further, the hydraulic fluid deilvered by the hydraulic pump and kept at a maximum circuit pressure (for example, 20 Kg/cm$^2$) is supplied into the ports 314 and 316 thereby to apply a rapid braking force due to the hydraulic fluid pressure to the vehicle.

(Operation II-i & j) When the brake pedal is continuously depressed further to make disappearance of the overlap "I" created in the second spool 312 and the overlap "J" created in the first spool 311, all the ports formed in the brake valve 31 are allowed to communicate with the drain port 309, so that the supply of both the hydraulic fluid pressures for actuating the safety brake and suppressing the spring force in the left and right brake units 16a, 16b commonly used by the hydraulic fluid conduit 41 and for actuating the interlocking valve unit 30 is cut off. As a result, a braking action caused by the force of the springs is applied to the vehicle.

When the depressing force exerted on the brake pedal 24 is released, the resilient force of the spool return spring 412 and the fluid pressure gradual increase setting spring 40 will return the first and second spools 311 and 312 to their original positions, and therefore the fluid communication between all the ports of the brake valve 31 with the drain port 309 is interrupted again, so that the hydraulic fluid pressure for actuating the interlocking valve unit 30 is restored. As a result, the counteractive fluid pressure for restraining the forces of the springs which is supplied by the hydraulic pump 22 into spring brake releasing chambers (not shown) for the left and right brakes commonly using the conduit 41 is rendered operative effectively thereby releasing the brakes by the action of the biasing forces of the springs.

Figure 3:
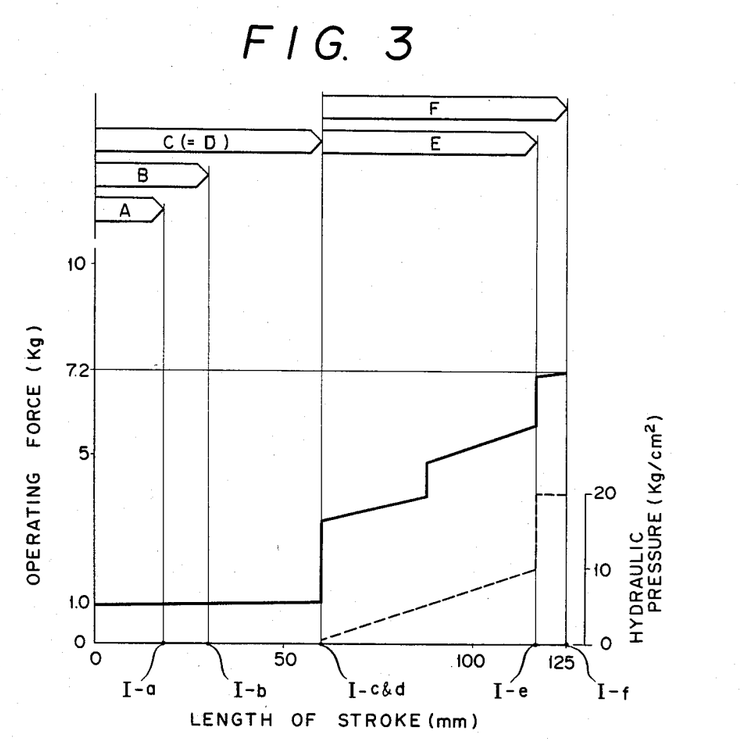
FIG. 3 shows a stroke diagram of the steering lever in combination with an operating force diagram.
Figure 4:
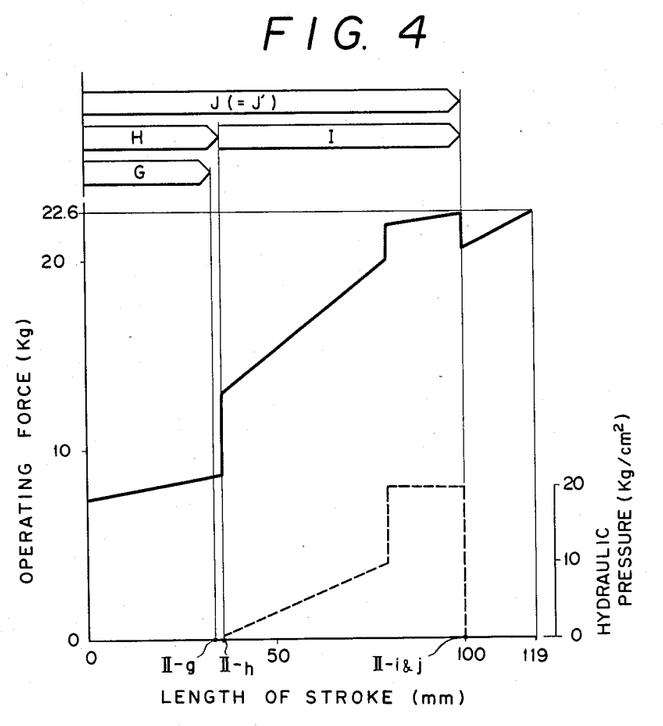
FIG. 4 shows a stroke diagram of a commonly used brake pedal in combination with an operating force diagram thereof.

The above-mentioned operation in the items I and II can be understood more clearly by making reference to the stroke diagrams of the steering lever and the commonly used brake pedal shown in FIGS. 3 and 4. At the same time, in FIGS. 3 and 4, the operating force for the steering lever and the commonly used brake pedal is also taken into consideration.

In the stroke diagram shown in FIG. 3, the relationship between the operating force (shown on the axis of ordinates) and the operation stroke (shown on the axis of abscissas with the length of stroke) of the steering lever 26b is shown with a solid line, and further, on the axis of ordinates, the fluid pressure for actuating the steering brake of the steering control valve 32 which varies in proportion to the operating force is shown with a dotted line, while the fuid pressure for actuating the center clutch unit which also varies in proportion to the operating force is shown with one point dotted line. Further, the stroke of each of the third and fourth spools 321 and 322 of the valve 32 is shown in terms of the clearance and the amount of overlaps between the large diameter portions and the valve body in parallel with the axis of abscissas. The reference characters I-a, I-b, I-c & d, I-e and I-f shown, in turn, along the axis of abscissas correspond to the operations described in the aforementioned items for explaining them. Further, the stroke diagram of the steering lever 26a is similar to that shown in FIG. 3.

In the stroke diagram shown in FIG. 4, the relationship between the operating force (shown on the axis of ordinates) and the operation stroke (shown on the axis of abscissas with the length of stroke) of both brake pedals 24 is shown with a solid line. Further, the fluid pressure for actuating the brake control valve 31 which varies in proportion to the operating force is shown with a dotted line on the axis of ordinates. Also, the stroke of each of the first and second spools 311 and 312 of the brake control valve 31 is shown in terms of clearance and the amount of overlaps between the large diameter portions and the valve body in parallel with the axis of abscissas. The reference characters II-g, II-h and II-i & j shown in turn along the axis of abscissas correspond to the operations described in the aforementioned items explaining them.

I claim:

1. A steering control system for crawler tractor type vehicles comprising an engine; a power distributor means adapted to distribute the power derived from the engine into two equal independent portions; left and right independent torque converters each of which receives one of the equally distributed portions, respectively; a power transmission mechanism with left and right power trains independent of each other, each power trains including a transmission gear means, a steering brake means and a reduction gear means and adapted to transmit the power from the left or right torque converter to left or right drive wheel, respectively; and a center clutch means adapted to directly connect or disconnect left and right power take-off transverse shafts, characterized in that said steering control system comprises an interlocking valve means located between a manually operated section and an actuating section and adapted to operatively connect the manually operated section and the actuating section, said manually operated section including a pair of left and right steering levers, linkages connected to the steering levers, respectively, a commonly used brake pedal and a linkage connected to the brake pedal, said actuating section including said left and right steering brake means and said center clutch means; and a hydraulic circuit for selectively supplying hydraulic fluid delivered by a hydraulic pump into said actuating section in response to the action of said interlocking valve means caused by the manipulation of either of said left and right steering levers and/or said brake pedal, whereby said left and right steering brake means and said center clutch means are interrelatedly operated, respectively.

2. The steering control system as claimed in claim 1, characterized in that said left and right steering brake means are respectively mounted on power take-off shafts of the left and right transmission gears which are located upstream said power take-off transverse shafts in the power transmission trains.

3. The steering control system as claimed in claim 2, characterized in that said interlocking valve means comprises left and right steering control valves and a commonly used brake control valve.

4. The steering control system as claimed in claim 3, characterized in that said left and right steering control valves are respectively connected to said pair of left and right steering levers and linkages respectively connected thereto, and said commonly used brake pedal and the linkage connected thereto.

5. The steering control system as claimed in any one of claims 1 to 4, characterized in that said interlocking valve means comprises a valve body; first, second and third spool bores formed in parallel or juxtaposition in the valve body; a rear end plate fixedly secured through seal means to the valve body to close the rear ends of the spool bores;

a first spool slidably mounted in the front half portion of said first spool bore so as to form a commonly used brake preferential change-over valve and connected to a linkage, the leading end of which is connected to the brake pedal;

a second spool slidably mounted in the rear half portion of said first spool bore in alignment with said first spool so as to form a brake fluid pressure gradually increasing valve, the rear end portion of said second spool containing a reaction force piston means being arranged to abut against said rear end plate through a return spring;

a third spool slidably mounted in the front half portion of said second spool bore so as to form a center clutch change-over valve and connected to a linkage, the leading end of which is connected to the right steering lever; a fourth spool slidably mounted in the rear half portion of second spool bore in alignment with said third spool so as to form a right brake fluid gradually increasing valve, the rear end portion of said fourth spool containing a reaction force piston being arranged to abut against said rear end plate through a return spring;

a fifth spool slidably mounted in the front half portion of said third spool bore so as to form another center clutch change-over valve and connected to a linkage, the leading end of which is connected to the left steering lever; and a sixth spool slidably mounted in the rear half portion of said third spool bore in alignment with said fifth spool so as to form a left brake fluid pressure gradually increasing valve, the rear end portion of said sixth spool being arranged to abut against said rear end plate through a return spring;

said center clutch change-over valve being adapted to produce a fluid pressure for changing over said center clutch by operating either one of the left and right steering levers thereby effecting double check function to prevent the interference with the change-over circuit which is inoperative, each longitudinal connection of the pairs of said first and second, third and fourth, and fifth and sixth spools comprising a flanged spacer ring slidably mounted on the reduced diameter portion formed at the leading end of each rear spool, the forward movement of said spacer ring being prevented by a snap ring, and a fluid pressure gradually increasing spring located between the flange of said spacer ring adapted to abut against the rear end face of each front spool and the end face of the stepped portion of said rear spool.

6. The steering control system as claimed in claim 5, characterized in that said interlocking valve means further comprises annular front end plates each having an aperture through which the leading end of each of the front spool passes, each of said annular front end plates being fixed at the inlet of a slot having a diameter slightly larger than that of the spool bore and formed in the front portion of said valve body where the leading end of each of the front spools for the left and right steering control valves is disposed, each of said annular side plates being fixedly secured through a seal ring and a snap ring to the valve body;

pairs of flanged annular spacers, each pair being slidably mounted on the periphery of each of said front spools between the inner bottom surface of said slot and said annular front end plate; and a brake actuation commencing point indicating spring resiliently clamped between the flanges of said pair of annular spacers so as to maintain normally a predetermined spacing between said spacers.

* * * * *